United States Patent [19]
Valentine et al.

[11] Patent Number: 6,018,654
[45] Date of Patent: Jan. 25, 2000

[54] METHOD AND APPARATUS FOR DOWNLOADING TONES TO MOBILE TERMINALS

[75] Inventors: Eric Lee Valentine; Jim Mills, both of Plano, Tex.

[73] Assignee: Ericsson Inc, Research Triangle Park, N.C.

[21] Appl. No.: 08/739,623

[22] Filed: Oct. 29, 1996

[51] Int. Cl.[7] ................................ H04Q 7/22; H04Q 7/32
[52] U.S. Cl. .......................... 455/414; 455/419; 455/567
[58] Field of Search ..................... 455/414, 415, 455/419, 466, 551, 567; 379/101.01, 374, 375

[56] References Cited

U.S. PATENT DOCUMENTS 5,371,781 12/1994 Ardon ...................................... 455/445
5,481,599 1/1996 MacAllister et al ............... 379/101.01

FOREIGN PATENT DOCUMENTS

0 562 890 9/1993 European Pat. Off. .
WO 93/26132 12/1993 WIPO .

*Primary Examiner*—Andrew M. Dolinar
*Attorney, Agent, or Firm*—Jenkens & Gilchrist

[57] ABSTRACT

A method and apparatus for downloading tone data from a public land mobile network to a mobile telephone unit is disclosed. A mobile telephone unit includes means enabling the user to request downloading of tone data to the mobile telephone unit from a public land mobile network via a connection-less communications link such as the USSD or SMS. The downloaded tone data is uniquely associated with a selected telephone number within the mobile telephone unit such that a call to the mobile unit involving the telephone number initiates audio play back of the tone data.

54 Claims, 4 Drawing Sheets

METHOD AND APPARATUS FOR DOWNLOADING TONES TO MOBILE TERMINALS

BACKGROUND OF THE INVENTION

1. Technical Field of the Invention

The present invention relates to personal communication systems, and more particularly, to the downloading of tone data to a mobile terminal to enable the playing of the tones in association with a particular telephone number.

2. Description of Related Art

The ever expanding list of services available via personal communication services (PCS) systems have provided PCS users with the ability to select a number of services from their mobile telephone unit in addition to the standard telephone communication services. A number of these services require the user to view some type of graphical or alphanumeric display upon the mobile telephone unit. Having to view the display can in some cases be inconvenient, for example, if the user happens to be driving, if the telephone is located in the user's pocket or briefcase, or if the user is involved in activity precluding the use of their hands. Thus, it would be beneficial to enable the user to know who is calling without having to check the calling number display.

In other cases using existing PCS technologies, the user may have more than one telephone number associated with a particular mobile telephone unit, for example, a personal telephone number and a business telephone number. The user can benefit by knowing whether the personal or business number has been called by the use of an indicator that does not require the user to look at the phone. This will enable the user to answer the mobile telephone unit differently based upon whether the business number or personal number was called. Thus, a mobile telephone unit providing the user with the option to select and download new tones to be used for different call scenarios would provide an ease of use and flexibility that would greatly benefit the user.

SUMMARY OF THE INVENTION

The present invention overcomes the foregoing and other problems with a method and apparatus for downloading tone data between a public land mobile network (PLMN) and a mobile unit. A mobile unit includes a client application for requesting the downloading of tone data from a PLMN through a connection-less communications link. Requests from the client application are received by a server application located within the public land mobile network. The server application is normally associated with the mobile switching center (MSC). The server application provides access to a tone data base wherein a user may select a tone for downloading through the mobile unit's user interface.

Once a tone is selected, the tone data associated with the tone is downloaded to the mobile unit via the connection-less user interface. The interface preferably comprises either short message service (SMS) messages or unstructured supplemental services data (USSD) messages which are useful for downloading unstructured user designated data. The downloaded tone data is then uniquely associated with a selected called or calling party telephone number, or group of numbers, such that when a call to the mobile unit involves the selected telephone number, an audio play back of the tone data is initiated.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Telecommunication services are normally performed in a structured way. For example, specific predefined data, formats, and signal names are used to set up a speech connection, to perform handovers, and to authenticate mobile subscriber information when providing telecommunication service to a mobile subscriber. With the introduction of the global system for mobile communications (GSM) and the personal communications systems (PCS), a number of new and advanced supplementary services are being provided to mobile subscribers. Since these supplementary services utilize user specified data, there are no structured ways to communicate this data between the public land mobile network (PLMN) and a mobile station. As a result, a number of unstructured business protocols have been developed for the GSM or PCS environments. As the transmission of tone data between a PLMN and a mobile unit falls under the category of transmitting unstructured user data, the transfer would be controlled by one of these protocols.

Once such protocol is unstructured supplementary service data (USSD) which has been introduced to enable user interaction between PLMN applications and a mobile station in a transparent way through a mobile telecommunication network. The communication is transparent because no review or manipulation of the contents of the message is performed during the transportation period.

Figure 1:
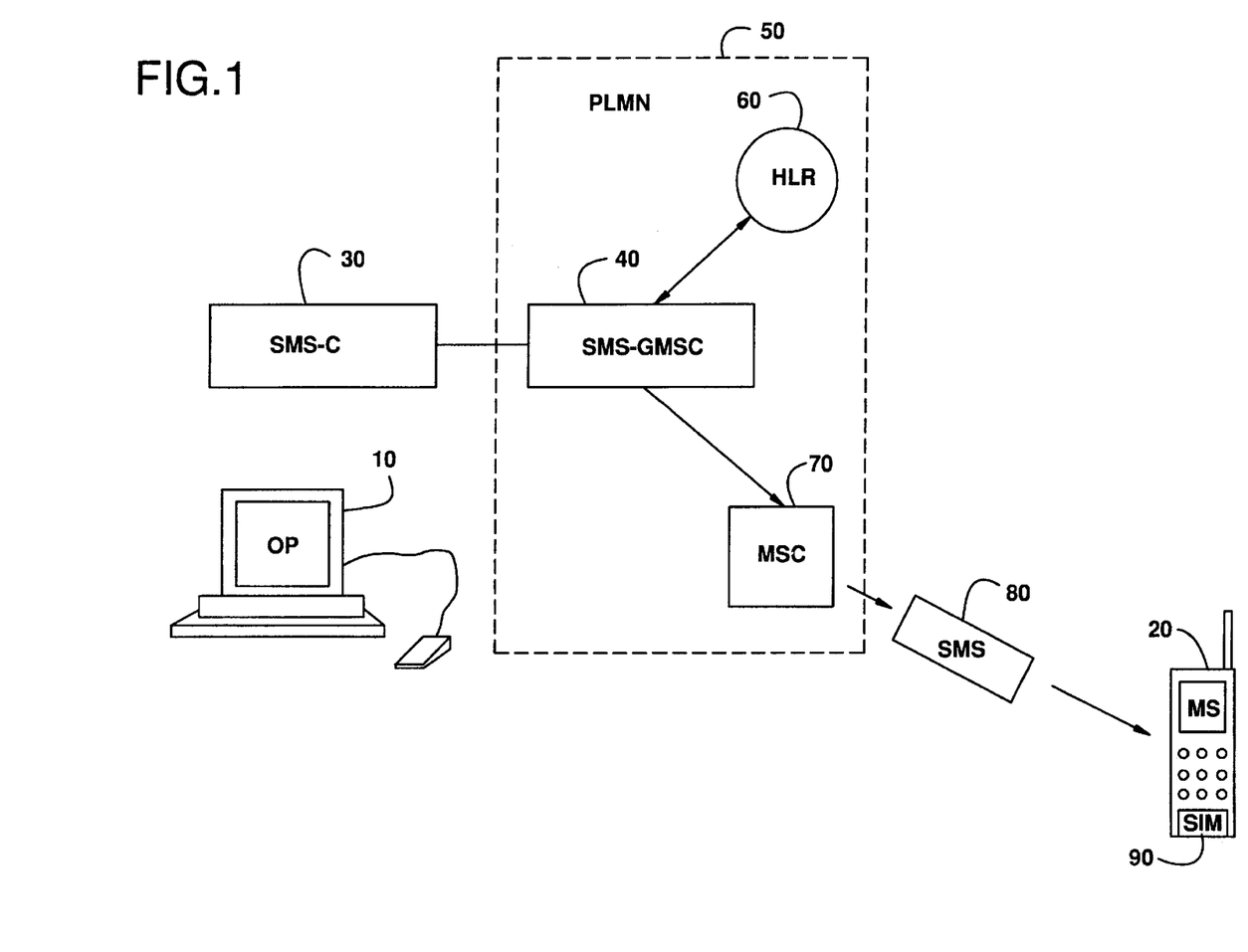
FIG. 1 is a block diagram illustrating the communication of a short message service (SMS) messages between a SMS operator and a mobile station.

One type of user specified information that may be transmitted between a PLMN and a mobile telephone unit is tone data, which then may be associated with called or calling numbers in a manner designated by the user. Reference is now made to FIG. 1, where a block diagram generally illustrates the communication of a short message service (SMS) message between an SMS operator 10 and mobile station 20. The SMS operator 10 sends data to the short message service center (SMS-C) 30 to be transmitted to the mobile station 20. The SMC-C 30 encapsulates the entered data into a packet message, such as signaling system number 7 (SS 7) signals or X.25 protocol packets, and routes the message to a short message service-gateway mobile switch center (SMS-GMSC) 40 within a PLMN 50 serving the mobile station 20. The SMS-GMSC 40 interrogates a home location register (HLR) 60 associated with the mobile unit 20 for routing information (i.e., an identification where the mobile station 20 is currently located) and subsequently routes the message to a mobile switching center (MSC) 70 serving the mobile station's current location. The mobile station 20 is paged and a connection is set up between the mobile station and the PLMN 50.

If the mobile station 20 is already busy, the connection setup is not performed because the network already knows the mobile station 20 is accessible. If the connection has been successful and thereby the mobile station 20 authenticated, the MSC 70 encapsulates the tone data into an SMS message 80 and delivers the SMS message to the mobile station 20 over one of the control data channels. The control data channel such as a stand alone dedicated control channel (SDCCH) is used instead of a traffic channel (TCH) to allow connection-less data communication. After receiving the SMS message 80 encapsulating the tone data, the mobile station acts merely as a buffer and passes the data to the attached subscriber identity module (SIM) card 90. The SIM card 90 then stores the received data into an internal buffer or memory register. Lastly, if the delivery has been successful, a successful delivery report is sent back from the MS 20 to the serving MSC 70, and subsequently from the serving MSC 70 to the SMS-C 30. Otherwise, a failure report is generated.

With respect to a mobile originated SMS message (MO-SMS) a user at a mobile station 20 can initiate an SMS signal to request downloading of data, such as tone data. The mobile station 20 makes a request to the mobile switching center (MSC) 70 to transmit tone data to the mobile station 20. The MSC 70 encapsulates the request into a packet message, and routes the message to a short message service gateway mobile switch center (SMS-GMSC) 40 within a PLMN 50 serving the mobile station 20. The SMS-GMSC 40 retrieves the requested data and subsequently routes a message to the MSC 70 serving the mobile station's current location. The mobile station 20 is then paged and a connection is set up between the mobile station and the PLMN 50. The MSC 70 encapsulates the tone data into an SMS message 80 and delivers the SMS message to the mobile station 20 over one of the control data channels. The data is then stored within the SIM card 90 as previously described.

Figure 2:
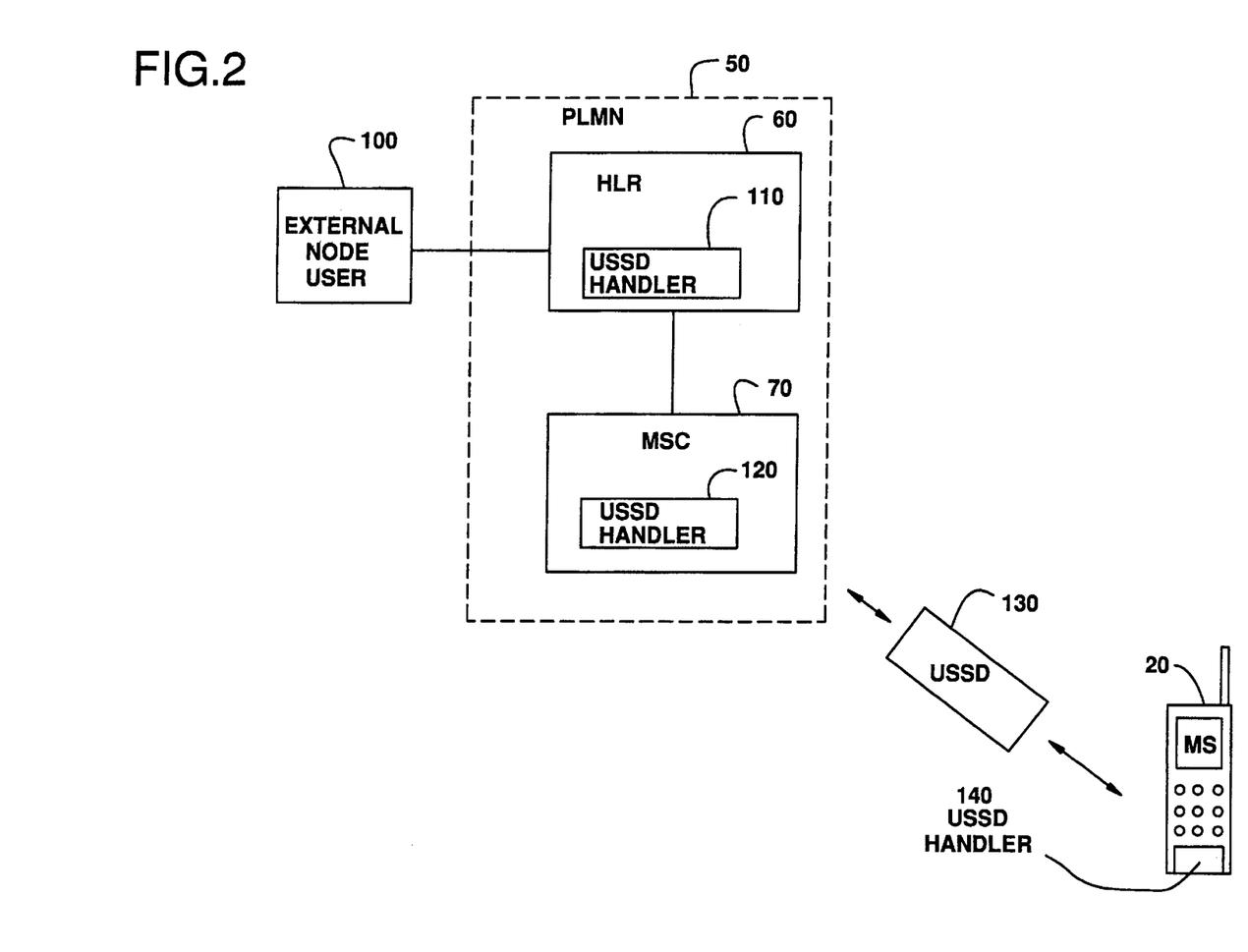
FIG. 2 is a block diagram illustrating the communication of an unstructured supplemental services data (USSD) messages between a USSD external node user and a mobile station.

FIG. 2 is a block diagram illustrating the communication of a USSD message between a USSD external node user 100 and a mobile station 20. USSD messages are utilized by the mobile telecommunications network to transport user defined data to a mobile station 20 or an application module within a mobile station. Therefore, instead of storing and receiving character data into a SIM card, the received data is either manipulated by the feature application modules within the receiving mobile station to provide special subscriber feature functions, or it is displayed on a display unit for user interactions.

The external node user 100 transmits the USSD message encapsulating the tone data to the HLR 60 within the serving PLMN 50. The HLR 60 is associated within a number of different MSC's within the same PLMN 50. As the mobile station 20 travels from one MSC's area to another, the HLR receives location update signals into record of the mobile station's current location. Whenever a USSD signal is received by the HLR, the HLR ascertains a current location of the mobile station 20. The USSD handler 110 within the HLR 60 thereafter transparently forwards the USSD signal to the appropriate MSC 70 currently serving the mobile station 20. The USSD handler 120 within the serving MSC 70 receives the transmitted message and transports the USSD message 130 to the mobile station 20 over a connection-less communications link. The USSD handler 140 within the mobile station 20 then receives the transmitted USSD message 130, extracts encapsulated tone data, and forwards the extracted data to the appropriate application module.

Figure 3:
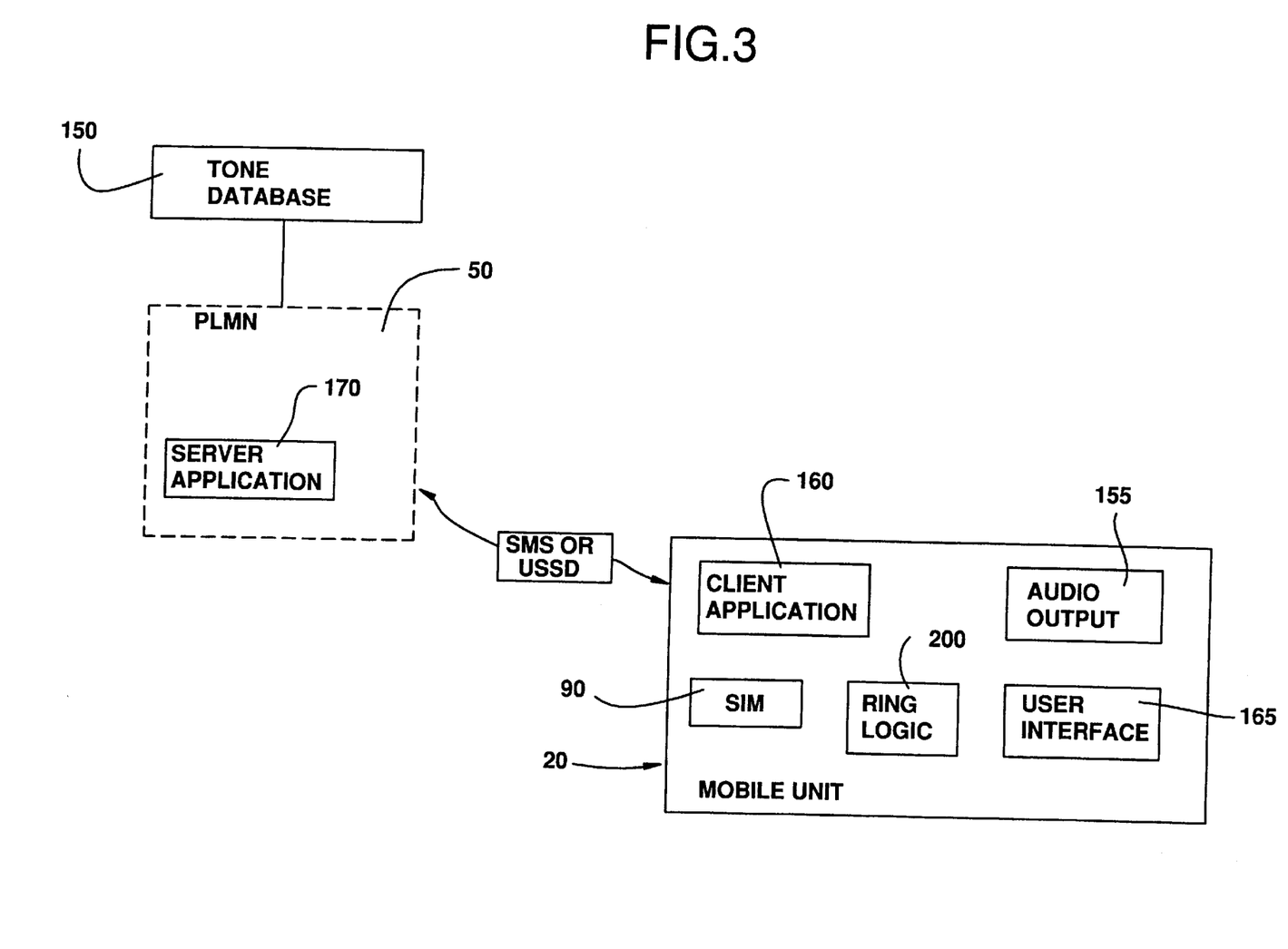
FIG. 3 is a block diagram illustrating the components necessary for downloading of tones between a PLMN and mobile unit.

Referring now to FIG. 3 where a block diagram illustrates the components necessary for downloading tones requested by a subscriber (user). The subscriber requests access to a tone database 150 containing a variety of predetermined data packages representing a particular tone or group of tones to be played by the audio output 155 of the mobile unit 20 in response to a particular calling or called number. The client application 160 within the mobile unit 20 initiates a request for access to the tone database in response to inputs by the user through the user interface 165. The client application 160 actuates a serving application 170 located with the PLMN. The serving application 170 may be located with the MSC/VLR, the HLR, or some other external node. The serving application 170 connects the user with the database 150 using either the SMS or USSD protocols discussed earlier. The user then selects desired tones in a manner which will be more fully described with respect to FIG. 4.

The tone data associated with the tone selected from the tone database 150 is downloaded to the client application 160 as a digitally coded tone pattern using either the USSD or SMS protocols described previously with respect to FIGS. 1 and 2. The above-described manner of downloading a tone from the tone database 150 is utilized with respect to menu driven options solely using SMS or USSD messages. optionally, an audio menu may be provided to the user such that an actual connection is generated between the mobile station 20 and the tone database 150. In this case, an audio version of the tones would be played for the user and the client application 160 would record the tone and convert it to a digital format for storage in the SIM card 90.

In the case of a transmission using a SMS message, the serving MSC 70 receives the transmitted tone signal from the SMS-GSMC 40 and then transmits an SMS message encapsulating the tone data to the mobile unit station 20 over a connection-less communication link such as SDCCH. The client application 160 within the mobile unit 20 acts as a buffer for the SMS message and passes the tone data from the message to the SIM card 90. The user may then, through client application 160, associate the tone within the SIM card 90 with a particular calling or called telephone number.

If a USSD message is used for downloading, the tone data is routed to the mobile station 20 by a USSD handler 120 within the serving MSC 70 as a USSD message encapsulating the tone data over a connection-less communication link such as SDCCH. USSD handler 140 within the mobile station receives the transmitted USSD message and forwards the message to the client application 160 for extraction of the tone data. The extracted tone data is then stored within the SIM card 90. Through the client application 160, the user may then uniquely associate the tone with a particular calling or called telephone number.

Once the tone data is downloaded into the SIM card 90 of the mobile unit 20 and associated with a particular telephone number, the receipt of an incoming call actuates ring logic 200 within the mobile terminal 20. The ring logic 200 checks for the presence of tone pattern associated with the number called or the number of the party calling. If such an association is found, the tone data is played by the audio output 155 to provide an audio indicator to the user of who is calling or which of the user's numbers is being called.

Figure 4:
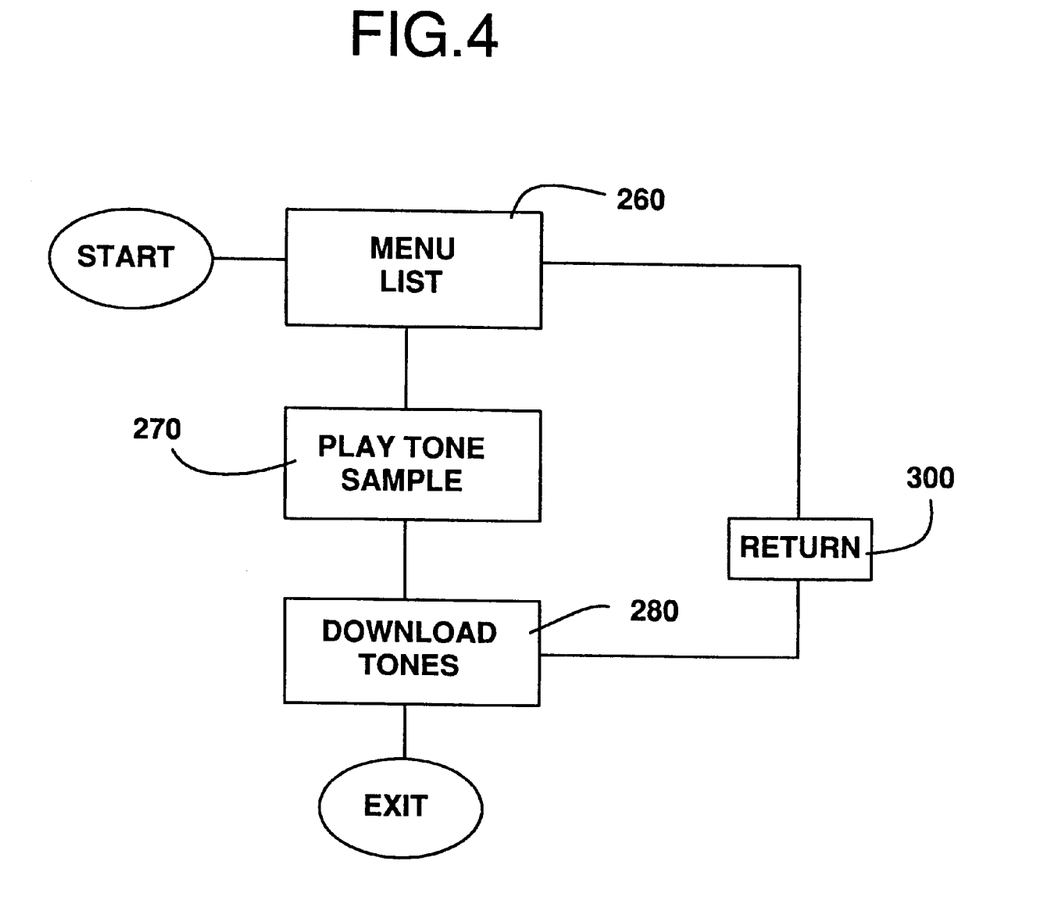
FIG. 4 is a block diagram illustrating the manner through which a user interactively downloads tones to a subscriber identity module (SIM) card.

Referring now to FIG. 4, there is illustrated the procedure by which a user may download a particular tone pattern from the tone database 150. Once the mobile unit 20 has interconnected with the tone database 150, the mobile unit user is presented at step 260 with a variety of menus enabling the selection of tones by the user. The menus may break the tones down in a variety of manners such as alphabetically, by music type, by novelty items, etc. Once a particular tone is selected, the user may play a sample tone at step 270 to preview what the tone sounds like. When a desired tone or tone pattern is found, the user may instruct the application 160 to download the tones at step 280. Otherwise, a user may return to previous menus at step 300.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A mobile station, comprising:
   a receiver for receiving tone data over a wireless connection-less communications link from a public land mobile network;
   a subscriber identity module card for storing the tone data; and
   means for requesting downloading of the tone data to the subscriber identity module card from the public land mobile network over the wireless connection-less communications link and for associating a telephone number with the tone data such that call connections involving the telephone number initiate audio playback of the tone data.

2. The mobile station according to claim 1, wherein the wireless connection-less communications link comprises short message service messages.

3. The mobile station according to claim 1, wherein the wireless connection-less communications link comprises unstructured supplementary service data messages.

4. The mobile station according to claim 1, wherein the telephone number comprises a telephone number of a calling party.

5. The mobile station according to claim 1, wherein the telephone number comprises a telephone number of a called party.

6. The mobile station according to claim 1, further comprising control logic for determining if an incoming call involves the telephone number and initiating audio playback of the tone data for incoming calls involving the telephone number.

7. A system for downloading tone data to a mobile station, comprising:
   a public land mobile network serving said mobile station, said public land mobile network including a first application module responsive to a request from the mobile station for downloading said tone data to the mobile station via a wireless connection-less communications link; and
   said mobile station comprising:
      a subscriber identity module card for storing said tone data;
      a receiver for receiving said tone data from the public land mobile network over the wireless connection-less communications link; and
      means for requesting downloading of the tone data to the subscriber identity module card from the public land mobile network over the wireless connection-less communications link and for associating a telephone number with the tone data such that call connections involving the telephone number initiate audio playback of the tone data.

8. The system according to claim 7, wherein the wireless connection-less communications link comprises short message service messages.

9. The system according to claim 7, wherein the wireless connection-less communications link comprises unstructured supplementary service data messages.

10. The system according to claim 7, wherein the telephone number comprises a telephone number of a calling party.

11. The system according to claim 7, wherein the telephone number comprises a telephone number of a called party.

12. The system according to claim 7, further comprising control logic for determining if an incoming call involves the telephone number and initiating audio playback of the tone data for incoming calls involving the telephone number.

13. A method for downloading tone data, comprising the steps of:
   accessing a public land mobile network using a wireless communications link from a mobile unit;
   requesting access to tone data located within the public land mobile network from a client application within the mobile unit;
   downloading the requested tone data to a subscriber identity module card of the mobile unit through said wireless connection-less communications link; and
   associating the downloaded tone data with a selected telephone number.

14. The method according to claim 13, further comprising the step of playing an audio rendition of the tone data in response to receipt by the mobile unit of a call involving the selected telephone number.

15. The mobile station according to claim 13, wherein the wireless communications link comprises short message service messages.

16. The mobile station claim 13, wherein the wireless communications link comprises unstructured supplementary service data messages.

17. The mobile station according to claim 13, wherein the telephone number comprises a telephone number of a calling party.

18. The mobile station according to claim 13, wherein the telephone number comprises a telephone number of a called party.

19. The mobile station according to claim 13, wherein said step of requesting access provides audio playback of the tone data.

20. The mobile station according to claim 13, wherein said step of requesting access provides a text selection of the tone data.

21. A mobile station, comprising:
   a receiver for receiving tone data over a connection-less communications link from a public land mobile network;
   a register for storing the tone data; and
   means for requesting downloading of the tone data to the register from the public land mobile network over the connection-less communications link and for associating a telephone number with the tone data such that call connections involving the telephone number initiate audio playback of the tone data,
   wherein said connection-less communications link comprises a link selected from the group consisting of short message service messages and unstructured supplementary service data messages.

22. The mobile station according to claim 21, wherein the register comprises a subscriber identity module card attachable to the mobile station.

23. The mobile station according to claim 21, wherein the telephone number comprises a telephone number of a calling party.

24. The mobile station according to claim 21, wherein the telephone number comprises a telephone number of a called party.

25. The mobile station according to claim 21, further comprising control control logic for determining if an incoming call involves the telephone number and initiating audio playback o the tone data for incoming calls involving the telephone number.

26. A mobile station, comprising:
   a receiver for receiving tone data over a connection-less communications link from a public land mobile network;
   a register for storing the tone data; and
   means for requesting downloading of the time data to the register from the public land mobile network over the connection-less communications link and for associating a telephone number with the tone data such that call connections involving the telephone number initiate audio playback of the tone data, wherein said telephone number comprises a telephone number of a called party.

27. The mobile station according to claim 26, wherein the register comprises a subscriber identity module card attachable to the mobile station.

28. The mobile station according to claim 26, wherein the connection-less communications link comprises short message service messages.

29. The mobile station according to claim 26, wherein the connection-less communications link comprises unstructured supplementary service data messages.

30. The mobile station according to claim 26, wherein the telephone number comprises a telephone number of a calling party.

31. The mobile station according to claim 26, further comprising control logic for determining if an incoming call involves the telephone number and initiating audio playback of the tone data for incoming calls involving the telephone number.

32. A system for downloading tone data to a mobile station, comprising:
   a public land mobile network serving said mobile station, said public land mobile network including a first application module responsive to a request from the mobile station for downloading said tone data to the mobile station via a connection-less communications link; and
   said mobile station comprising:
      a register for storing said tone data;
      a receiver for receiving said tone data from the public land mobile network over the connection-less communications link; and
      means for requesting downloading of the tone data to the register from the public land mobile network over the connection-less communications link and for associating a telephone number with the tone data such that call connections involving the telephone number initiate audio playback of the tone data, wherein said connection-less communications link comprises a link selected from the group consisting of short message service messages and unstructured supplementary service data messages.

33. The system according to claim 32, wherein the telephone number comprises a telephone number of a calling party.

34. The system according to claim 32, wherein the telephone number comprises a telephone number of a called party.

35. The system according to claim 32, further comprising control logic for determining if an incoming call involves the telephone number and initiating audio playback of the tone data for incoming calls involving the telephone number.

36. A system for downloading tone data to a mobile station, comprising:
   a public land mobile network serving said mobile station, said public land mobile network including a first application module responsive to a request from the mobile station for downloading said tone data to the mobile station via a connection-less communications link; and
   said mobile station comprising:
      a register for storing said time data;
      a receiver for receiving said tone data from the public land mobile network over the connection-less communications link; and
      means for requesting downloading of the tone data to the register from the public land mobile network over the connection-less communications link and for associating a telephone number with the tone data such that call connections involving the telephone number initiate audio playback of the tone data, wherein said telephone number comprises a telephone number of a called party.

37. The system according to claim 36, wherein the register comprises a subscriber identity module card attachable to the mobile station.

38. The system according to claim 36, wherein said connection-less communications link comprises short message service messages.

39. The system according to claim 36, wherein said connection-less communications link comprises unstructured supplementary service data messages.

40. The system according to claim 36, wherein the telephone number comprises a telephone number of a calling party.

41. The system according to claim 36, further comprising control logic for determining if an incoming call involves the telephone number and initiating audio playback of the tone data for incoming calls involving the telephone number.

42. A method for downloading tone data, comprising the steps of:
   accessing a public land mobile network using a communications link from a mobile unit, said communications link comprising a link selected from the group consisting of short message service messages and unstructured supplementing service data messages;
   requesting access to tone data located within the public land mobile network from a client application within the mobile unit;
   downloading the requested tone data to the mobile unit through said communications link; and
   associating the downloaded tone data with a selected telephone number.

43. The method according to claim 42, further comprising the step of playing an audio rendition of the tone data in response to receipt by the mobile unit of a call involving the selected telephone number.

44. The method according to claim 42, wherein the telephone number comprises a telephone number of a calling party.

45. The method according to claim 42, wherein the telephone number comprises a telephone number of a called party.

46. The method according to claim 42, wherein said step of requesting access provides audio playback of the tone data.

47. The method according to claim 42, wherein said step of requesting access provides a text selection of the tone data.

48. A method for downloading tone data, comprising the steps of:
- accessing a public land mobile network using a communications link from a mobile unit;
- requesting access to tone data located within the public land mobile network from a client application within the mobile unit;
- downloading the requested tone data to the mobile unit through said communications link; and
- associating the downloaded tone data with a selected telephone number, said selected telephone number comprising a telephone number of a called party.

49. The method according to claim 48, further comprising the step of playing an audio rendition of the tone data in response to receipt by the mobile unit of a call involving the selected telephone number.

50. The method according to claim 48, wherein said communications link comprises short message service messages.

51. The method according to claim 48, wherein said communications link comprises unstructured supplementary service data messages.

52. The method according to claim 48, wherein the telephone number comprises a telephone number of a calling party.

53. The method according to claim 48, wherein said step of requesting access provides audio playback of the tone data.

54. The method according to claim 48, wherein said step of requesting access provides a text selection of the tone data.

* * * * *

UNITED STATES PATENT AND TRADEMARK OFFICE
CERTIFICATE OF CORRECTION

| | |
|---|---|
| PATENT NO. | : 6,018,654 |
| APPLICATION NO. | : 08/739623 |
| DATED | : January 25, 2000 |
| INVENTOR(S) | : Valentine et al. |

It is certified that error appears in the above-identified patent and that said Letters Patent is hereby corrected as shown below:

Column 7, line 14 in claim 26, "time" data should read --tone-- data

Signed and Sealed this

Seventeenth Day of July, 2007

JON W. DUDAS
*Director of the United States Patent and Trademark Office*